Sept. 6, 1960 P. F. COVER 2,951,485
CORN CUTTING HEAD

Filed Sept. 24, 1957 4 Sheets-Sheet 1

INVENTOR
PAUL F. COVER

BY Cushman, Darby & Cushman

ATTORNEYS

Sept. 6, 1960 P. F. COVER 2,951,485
CORN CUTTING HEAD
Filed Sept. 24, 1957 4 Sheets-Sheet 3

INVENTOR
PAUL F. COVER
BY Cushman, Darby & Cushman
ATTORNEYS

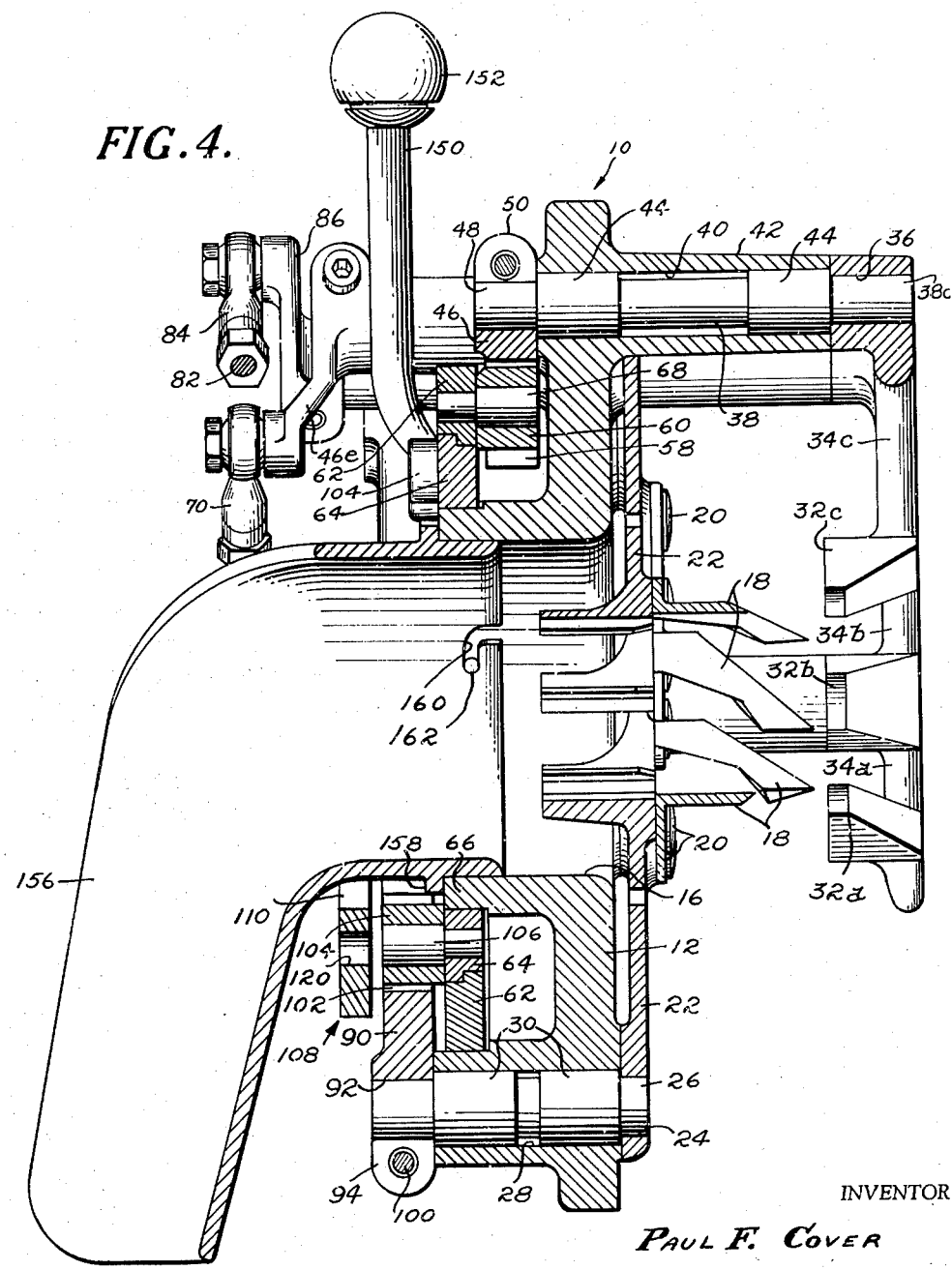

United States Patent Office 2,951,485
Patented Sept. 6, 1960

2,951,485

CORN CUTTING HEAD

Paul F. Cover, % The United Company, Tuc Road, Westminster, Md.

Filed Sept. 24, 1957, Ser. No. 685,975

14 Claims. (Cl. 130—9)

This invention relates to machines for cutting green corn and more particularly to an improved cutting head for use in such machines.

The present invention constitutes an improvement on the cutting heads disclosed in Cover Patent No. 2,141,346, issued December 27, 1938, and Cover Patent No. 2,216,065, issued September 24, 1940. While the cutting heads disclosed in the above-identified patents have proven to be quite satisfactory in operation, particularly when utilized to remove kernels of green corn from the cob, the cutting heads are limited in the type of cut that can be obtained. It has been observed that the depth of the kernels is related to the size or diameter of the ears. This relationship holds generally true even for kernels on the same cob. That is, on a tapering ear, the kernels disposed on the cob adjacent the smaller end are of lesser depth than the kernels adjacent the larger diameter end of the cob.

Today, more and more hybrid varieties of corn are being produced and many of these varieties taper throughout most, if not all of their entire length. While it cannot be established that the depth of kernel is always related in the same proportion to the diameter of the ear, it is generally true that the smaller the diameter, the more shallow the depth of the kernel in any variety. Also the particular relationship between the depth of the kernel and the diameter of the ear will vary with different varieties.

The cutting heads disclosed in the above-mentioned patents, which are currently in use, provide depth gages that contact the exterior surface of the ears and the cutting blades for removing the kernels from the cob are fixedly secured to the depth gages for movement therewith inwardly and outwardly in response to the positioning of the depth gages by the exterior diameter of the ear. Since the blades are connected with the depth gages in a fixed position, the depth of cut by the blades is always the same. Thus, in cutting green corn from the cobs of hybrid ears, it is necessary to set the gage at an average position, which results in substantial waste when cutting relatively large ears or relatively large portions of single ears, and inefficency when cutting relatively small ears or relatively small portions of single ears.

Accordingly, it is an object of the present invention to provide a cutting head for corn cutting machines having improved means for varying the depth of cut of the cutting blades in response to the movement of the depth gages as a result of engagement with the diametrically varying exterior surface of the corn ears.

Another object of the present invention is the provision of an improved depth gaging means for the cutting blades of a corn cutting head, which means is operable to increase the depth of cut in response to an increase in the diameter of the ear of corn engaged by the depth gages and to decrease the depth of cut in response to a decrease in the diameter of the ear of corn engaged by the depth gages.

Still another object of the present invention is the provision of an improved depth regulating means of the type described embodying cam elements which may be readily adjusted and/or modified so as to enable the rate of change of the depth of cut to be varied in substantially any predetermined relation throughout the entire range of operation.

Still another object of the present invention is the provision of a depth regulating means of the type described having means embodied therein for increasing or decreasing the depth of cut for any particular setting of the depth gages as determined by the diameter of the ear so that the depth of cut will be correspondingly increased or decreased at all of the settings within the range provided.

Still another object of the present invention is the provision of a cutting head of the type described embodying a pair of movable members, preferably adjacent rotatable rings, one being connected to the depth gages for simultaneous movement therewith, and the other being connected to the cutting blades for simultaneous movement therewith and means including a turning knob actuated adjusting device for connecting the rings together so as to vary the depth of cut.

Another difficulty encountered in the operation of the cutting heads disclosed in the above patents relates to the accumulation of corn silk and other residue, resulting from the cutting of the kernels from the cob, on parts of the cutting head disposed immediately below the area thereof where the cutting takes place. That is, with the use of the known cutting heads, the blades serve to remove the kernels from the cob and the removed kernels fall by gravity through a collection chute. The cutting heads of the patents included depth gage arms in the path of downward movement of the removed kernels and, therefore, silk and other residue deposited on these arms and the head required cleaning after short periods of operation.

Accordingly, it is another object of the present invention to provide a cutting head for corn cutting machines having improved means for mounting the depth gages so that the space beneath the cutting blades is free from permanent structure upon which corn silk and other residue may accumulate, thus completely alleviating the disadvantages noted above.

A still further object of the present invention is the provision of a cutting head of the type described which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 4 is a cross-sectional view taken along line 4—4 of Figure 3, and

Referring now more particularly to the drawings, there is shown a cutting head, generally indicated at 10, which embodies the principles of the present invention. The cutting head is adapted to be utilized in a corn cutting machine, such as disclosed in Cover Patent No. 2,332,894, issued October 26, 1943. While it is not believed necessary to the understanding of the present invention to describe the operation of the machine in detail, suffice it to say that the machine is operable to feed successive ears of corn in the direction of the axis of the cob into and through the cutting head 10. The cutting head may be mounted on the machine in the manner indicated in Cover Patent No. 2,510,558, issued June 6, 1950.

Figure 2:
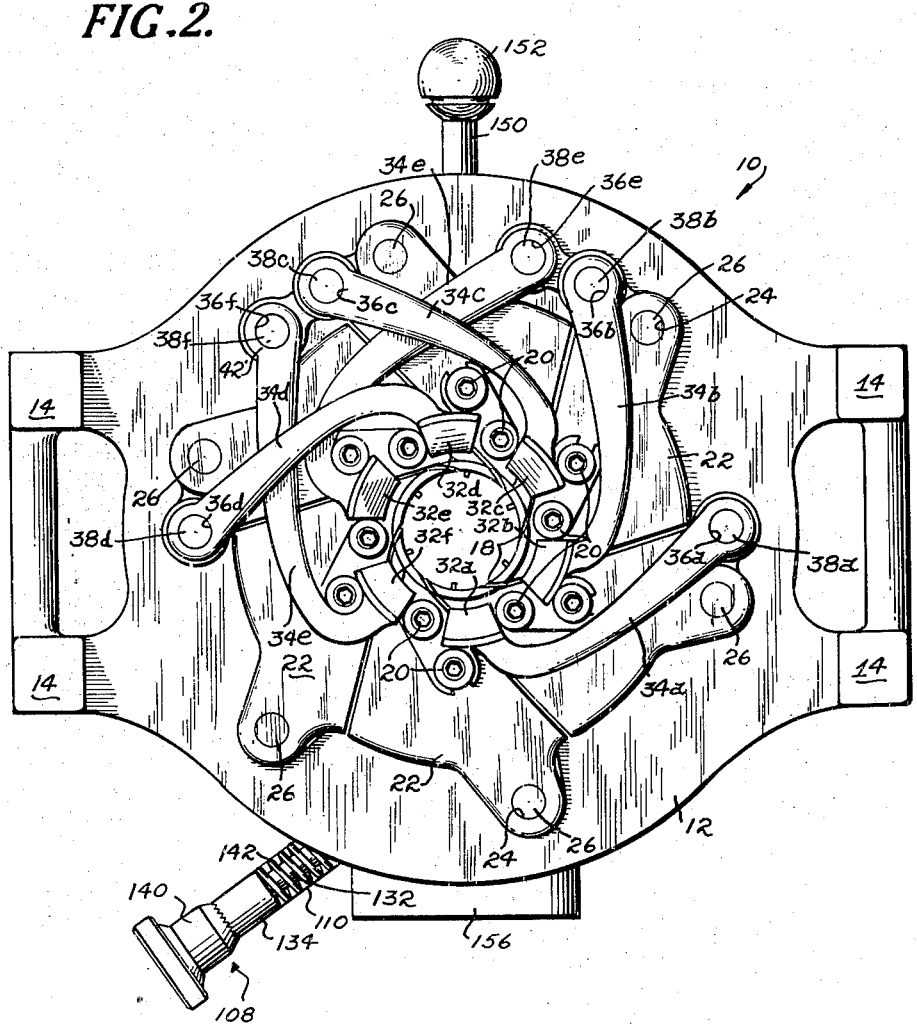
Figure 2 is a front elevational view of the cutting head.
Figure 3:
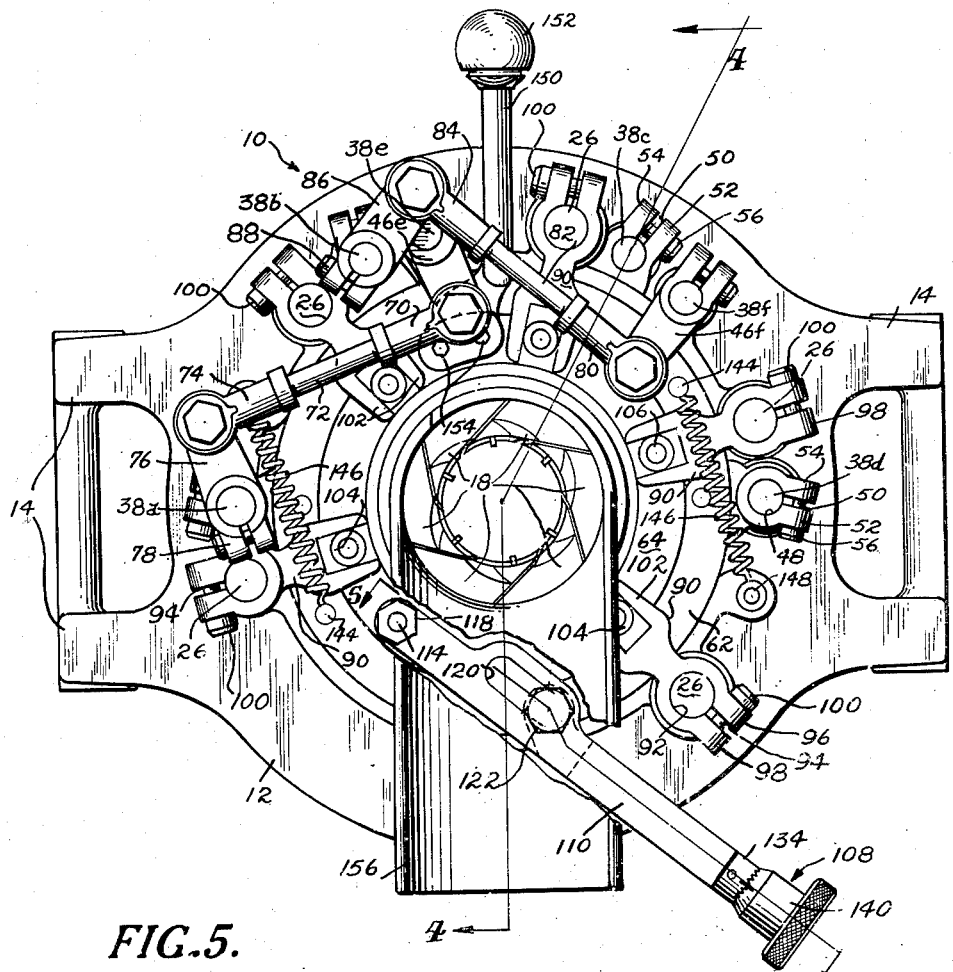
Figure 3 is a rear elevational view of the cutting head with parts broken away for purposes of clearer illustration.

Referring now more particularly to Figures 2, 3 and 4, the cutting head 10 includes a head plate or support 12 of generally ring-shaped configuration having diametrically opposed outwardly extending ears 14, which serve to cooperate with suitable fastening elements or the like (not shown) so as to swingably secure the head plate on the machine in the manner indicated in the aforesaid Cover Patent No. 2,510,558. The head plate is preferably cast of any suitable material and includes a central horizontal opening or aperture 16 through which the ears of corn are fed. The head is mounted on the machine such that the axis of the cobs of the ears of corn fed through the head are substantially aligned with the axis of the opening 16.

Mounted on the head plate 12 adjacent the opening 16 is a series of circumferentially spaced cutting blades 18. Preferably, the cutting blades are constructed in the manner indicated in the above-mentioned Cover Patent No. 2,216,065. Each cutting blade 18 is adjustably secured, as by bolts or the like 20, to the inner end of a mounting arm 22 disposed in a vertical plane adjacent the forward face of the head plate 12. The outer end of each blade mounting arm 22 is apertured, as at 24, to receive the forward end of a shaft 26 journaled within a bore 28 extending horizontally through the head plate 12, as by spaced bearing races 30. As best shown in Figure 2, the shaft 26 for each mounting arm is fixed relative to the blade 18 carried thereby so that pivotal movement of the arm will result in an arcuate movement of the blade in a generally radial path with respect to the axis of the opening 16.

Disposed in advance of the blades 18 in a position closely adjacent thereto is a series of circumferentially arranged depth gage elements or regulators 32. These depth gage regulators are adapted to engage the exterior surface of the ears of corn fed to the cutting head 10 and, preferably, are in the shape of arcuate shoes or the like tapering outwardly and forwardly so that as an ear of corn is fed into the cutting head, the advancing end of the ear will engage the tapering surfaces and move the regulators outwardly until the arcuate portions are in engagement with the diameter of the ear. While any number of depth gage regulators may be provided, there is shown in the drawings six such regulators. Since the six regulators are not all mounted in the same manner about the axis of the opening 16, they have been designated with the subscript characters "a," "b," "c," "d," "e" and "f" for purposes of clearer illustration. Generally, however, each of the depth gage regulators 32 is secured to the inner end of a hook-shaped mounting arm 34 which has its outer end apertured, as at 36, to fixedly receive the forward end of a shaft 38. Each shaft 38 is journaled within a bore 40 extending through the head plate 12 and a forwardly extending boss 42, by any suitable means such as longitudinally spaced bearing races 44. The axis of each shaft 38 is disposed relative to the associated depth regulator shoe 32 so that the latter will swing in an arcuate path, which extends generally radially with respect to the axis opening 16.

Figure 1:
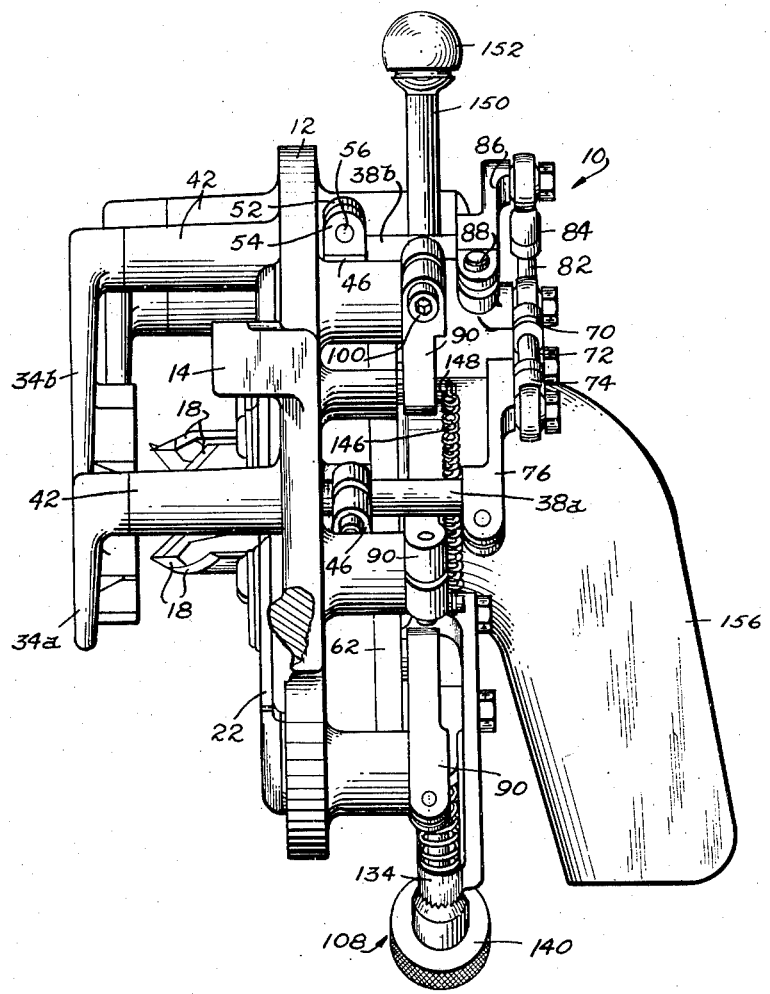
Figure 1 is a side elevational view of a cutting head embodying the principles of the present invention with parts broken away to more clearly illustrate one feature of the invention.

Depth gage regulators 32a, 32b, 32c and 32d are of identical construction and have their hook-shaped mounting arms 34a, 34b, 34c and 34d extending in a generally counterclockwise direction about the axis of the opening 16, as viewed in Figure 2. The shafts 38a, 38b, 38c and 38d are spaced apart an angular distance substantially equal preceding from the shaft 38a counterclockwise, as indicated in Figure 2, to the shaft 34d. The depth regulator 32e has its mounting arm 34e extending in a generally clockwise direction about the axis of the opening 16, as viewed in Figure 2 and secured to the shaft 38e which is disposed adjacent the shaft 38b. The depth regulator 32f also extends in a generally clockwise direction about the axis of opening 16, as viewed in Figure 2 and is secured to the shaft 38f which is disposed adjacent the shaft 38c. By disposing the shafts 38e and 38f above the opening 16, the space below the blades 18 is maintained free from permanent structure which would accumulate residue resulting from the removal of the kernels from the cob. As best shown in Figure 1, with the space below the blades completely free from permanent structure, the problems heretofore experienced with respect to the accumulation of residue and the cleaning of the head are completely eliminated.

The present invention is primarily concerned with an improved arrangement for connecting the mounting shafts 38 of the depth gage regulators to the mounting shafts 26 of the cutting blades 18 so that the depth of cut of the blades can be controlled in accordance with the size of the ear of corn being cut, as determined by the depth gage regulators. To this end, the rear end of each of the depth gage regulator mounting shafts 38a, 38b, 38c and 38d is provided with a short lever arm, generally indicated at 46. The outer end of each lever arm 46 has a horizontally extending aperture 48 formed therein for receiving the rear end of the associated shaft 38 and the outer extremity thereof is split, as indicated at 50, so as to provide spaced ears 52 and 54. A bolt 56 extends through the ear 52 and is threadedly engaged with the ear 54 so as to clamp the outer end of the associated lever 46 about the associated rear shaft end. It is also apparent that by loosening the bolt 56, each lever arm 46 may be moved into different positions of angular adjustment with respect to the associated shaft.

The inner end of each lever arm 46 is provided with a cam element, which, as shown, is in the form of a bifurcation 58. A cooperating cam element, which, as shown, is in the form of a roller 60, is disposed within each bifurcated end 58 and journaled on an outer ring 62, having its inner periphery journaled on the outer periphery of an inner ring 64. The inner ring 64 has its inner periphery journaled on the outer periphery of the rear end of a rearwardly extending hub portion 66 formed on the head plate 12. Each roller 60 is journaled on the outer ring 62 by any suitable means, such as a pin 68 secured to the outer ring and extending forwardly therefrom through the axis of the roller 60. It can thus be seen that since the shafts 38a, 38b, 38c and 38d are provided with levers 46 and the latter are connected to the ring 62 through the bifurcated ends 58 and rollers 60, the depth gage regulators 32a, 32b, 32c and 32d will move together.

In order to connect the depth gage regulators 32e and 32f for movement with the remaining depth gage regulators, the shaft 38e has a lever arm 46e secured thereto and extending inwardly therefrom. The inner end of the lever arm 46e has pivotally connected thereto a threaded sleeve 70 having a connecting rod 72 threaded therein. The opposite end of the rod is oppositely threaded for engagement within a sleeve 74 pivotally connected to the outer end of a lever arm 76 parallel with the lever arm 46e and having its inner end fixed to a rearward extension of the shaft 38a by a split clamp connection 78. In a like manner, the shaft 38f has a lever arm 46f secured thereto and extending inwardly therefrom. A sleeve element 80 is secured to the inner end of the lever arm 46f and threadedly receives one end of a connecting rod 82. The other end of the rod 82 is oppositely threaded and engaged within a sleeve member 84 pivotally connected to the outer end of a lever arm 86 parallel with the lever arm 46f. The opposite end of the lever arm 86 is connected with a rearward extension of the shaft 38b by a suitable split clamp connection 88. In this manner, the depth regulators 32e and 32f are mounted to move with the depth gage regulators 32a–d, but do not include lever arms connected with the outer ring 62 by means of a bifurcated end 58 receiving a roller 60.

The rear end of each blade mounting shaft 26 is provided with a long lever arm 90 of similar construction to the lever arm 46. That is, each lever arm 90 has its outer end provided with an aperture 92 to receive the associated shaft end and has its outer extremity split, as indicated at 94, so as to form a pair of ears 96 and 98. A bolt 100 extends through the ear 96 and is threadedly engaged in the ear 98 so as to clamp the lever arm on the shaft end. As before, the split clamp connection permits the lever arms to be disposed in different positions of angular adjustment with respect to the associated shaft. In addition, each lever arm 90 has its inner end bifurcated, as at 102, to form a cam element for receiving a cooperating cam element in the form of a roller 104 journaled on a pin 106 extending rearwardly from the inner ring 64.

Figure 5:
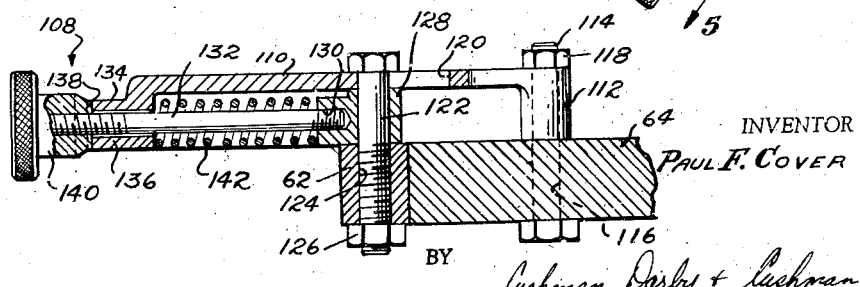
Figure 5 is a cross-sectional view taken along line 5—5 of Figure 3.

The inner and outer rings are adjustably secured together for simultaneous movement by means of an adjusting knob assembly, generally indicated at 108. As best shown in Figure 5, the adjusting knob assembly includes an elongated mounting bracket 110 having a transversely extending apertured boss 112 formed on the inner end thereof. The apertured boss receives a bolt 114, which also extends through a suitable aperture 116 formed in the inner ring 64. The bolt 114 is preferably retained in position by nut 118 threadedly mounted on the outer end thereof. In this manner, the inner end of the bracket 110 is pivotally secured to the inner ring 64. Formed in the bracket intermediate its ends is a longitudinally elongated slot 120 through which a bolt 122 extends. The opposite end of the bolt extends through an aperture 124 formed in the outer ring 62 and a suitable nut 126 is threaded on the outer end of the bolt to secure the same in position. Mounted on the bolt between the bracket 110 and the outer ring 62 is a sleeve 128 having a threaded socket 130 rigidly secured thereto and extending outwardly therefrom. Threadedly mounted within the socket 130 is the outer end of a rod 132 which extends outwardly parallel with the bracket 110 and through a longitudinally extending apertured boss 134 rigidly formed on the outer end of the bracket. The outer extremity of the boss is serrated, as at 136, to cooperate with the inner serrated end 138 of a knob 140 rigidly secured to the outer end of the rod 132. A coil spring 142 is mounted on the rod 132 intermediate its ends and has its inner end in engagement with the socket 130 and its outer end engaged with the boss 134 and, hence, serves to resiliently urge the mounting bracket outwardly with respect to the bolt 122 carried by the outer ring 62. It can be seen that by turning the knob 140, the rod 132 will be moved in and out of the socket 130, thus moving the bracket 110 in and out with respect to the bolt 122. Since the bolt 114 connected with the inner ring 64 is carried by the bracket, movement of the bracket serves to effect a change in the relationship between the inner and outer rings 64. However, because the bracket is carried solely by the rings, the latter move as a unit when disposed in any adjusted position.

Secured to the outer ring in diametrically opposed relation is a pair of rearwardly extending pins 144 for receiving one end of a pair of coil springs 146, the opposite end of which is connected with a pair of rearwardly extending pins 148 rigidly secured to the head plate 12. The springs 146 resiliently urge the cutting blades 18 and the depth gage regulators 32 into an inward limiting position. In order to manually move the cutting blades and depth gage regulators into an outward limiting position against the action of springs 146, there is provided a handle 150 having a knob 152 disposed on its outer end and its inner end secured to the inner ring 64 by any suitable means, such as bolts 154. A cob receiving guide element 156 has its forward end extending within the rearward end of the opening 16 and positioned therein by means of an outwardly extending radial flange 158, abutting the rear edge of the hub portion 66. Bayonet slots 160 are formed in the forward edge of the guide element 156 for receiving pins 162 extending radially into the opening 16 from the hub portion 66 so as to secure the guide element in position.

*Operation*

In operation, the cutting head 10 of the present invention is utilized with a corn cutting machine of the type illustrated in the above-mentioned Cover Patent No. 2,332,894. Preferably, the head is mounted on the machine by means of the ears 14 in the manner indicated in Cover Patent No. 2,510,558. With the cutting head mounted in operative position in the machine, the latter is operable to feed successive ears of corn in the direction of the longitudinal axis of the cob in and through the opening 16 of the head plate 12. The springs 146 serve to resiliently urge the depth gage regulators inwardly and as the ear of corn is fed through the cutting head, the depth gage regulators will contact the end thereof and be moved radially outwardly. It will be noted that this outward movement of the depth gage regulators results in a counterclockwise rotational movement of the shafts 38a, 38b, 38c, and 38d, as viewed in Figure 2. This rotational movement of the shafts will, in turn, move the lever arms 46 connected with the shafts 38 angularly in a clockwise direction, as viewed in Figure 3. The bifurcated ends 58 of the lever arms, in turn, serve to rotate the outer ring in a counterclockwise direction. Since the outer ring is connected to the inner ring by the adjusting knob assembly 108, the inner ring will move with the outer ring. This movement of the inner ring is transmitted to the lever arms 90 through the bifurcated ends 102 and rollers 104, which effects a clockwise movement of the shafts 26, as viewed in Figure 3. The pivotal movement of the shafts will, in turn, effect a radially outward movement of the cutting blades a predetermined distance.

With the above transmission of motion in mind, it can be seen that the bifurcated ends of the lever arms 46 and 90 and the cooperating rollers 60 and 104 serve as cam elements which transmit a varying degree of motion from the shafts 38 to the shafts 26. In addition, there is also a variation in the motion transmitted because of the difference in length of the short lever arms 46 and the long lever arms 90. The arrangement is such that when the depth gage regulators are disposed in an outer position, as for example, when they are engaging a relatively large ear of corn, the cutting edge of the blades are arranged to cut generally in a circle, which is disposed from the general circle defined by the inner periphery of the gage elements a relatively large distance or depth. As the depth gage regulators move inwardly, the motion transmitting means does not effect as great a movement of the blades and, hence, they will move inwardly a lesser amount. Thus, when the depth gage regulators are in an inwardly disposed position, as for example, when they are engaging a relatively small ear of corn, the cutting blades will be arranged in a general circle which is disposed a relatively small distance from the general circle in which the depth gage regulators are arranged. It will be readily understood that between the outermost position of the depth gage regulators and the innermost position thereof, the depth at which the blades will cut will vary. That is, the depth of cut decreases as the depth gage regulators move inwardly, and the depth of cut increases as the depth gage regulators move outwardly.

With the motion transmitting means shown, the change in depth of cut is not uniform between the extreme limits of the inward and outward movement of the depth regulators. However, by suitably changing the surface configuration of the bifurcated ends 58 and/or 102, the rate at which the depth is changed in response to the movement of the depth gage regulators can be made to conform to substantially any desired curve. For example, the bifurcated ends 58 and 102, as shown, are straight and during the angular movement of the lever arms, the effective lever arm will vary because the rollers 60 and 104 will have contact with the bifurcated ends along an inwardly and outwardly moving line. With this change of effective lever arm, there will be a change in the rate of angular movement transmitted to the outer ring 62. If a straight line relationship is desired, that is, if it is desired to maintain the depth of cut in direct proportion to the diameter of the corn anywhere between the limits, then the lever arm 46 can be made merely as a sector of a gear having teeth meshing with cooperating teeth formed on the ring 62 and in a like manner, the levers 90 could be gear sectors meshing with cooperating teeth on the inner ring 64. With this arrangement, there would be no variation in the effective lever arm through which the motion of the shafts 38 are transmitted to the outer ring and no variation in the effective lever arm between the motion transmitted by the inner ring to the shafts 26. Of course, it may be desirable to transmit the motion other than in a straight line proportion, and the present arrangement amply provides for this. For example, it will be noted that by suitably adjusting the angular position of either the lever arms 46 with respect to the shafts 38 or the lever arms 90 with respect to the shafts 26, or both, the rate of change in the depth of cut throughout the limits of movement can be changed to follow substantially any desired curve.

The adjusting knob assembly 108 provides a convenient means whereby the depth of cut throughout the entire range of movement can be increased or decreased. For example, it will be noted that the knob 140 can be turned to bring the bolts 122 and 114 closer together. This movement has the effect of moving the depth gage regulators inwardly relative to the blades 18. If the knob 140 is turned in the opposite direction, it will effect relative movement between the rings in the opposite direction, that is, the depth gage regulators will be moved outwardly relative to the blades. Once the knob has been turned and engaged in an adjusted position, the two rings are effectively maintained in a fixed position relative to each other so that they will move in unison. Thus, for a close setting between the bolts 122 and 114, the depth of cut when the depth gage regulators are disposed in their outermost position is relatively small and diminishes as the depth regulators move inwardly. With the bolts 122 and 114 moved apart, the depth of cut will be relatively large with the depth gage regulators in their outer position and will diminish as they move inwardly.

For purposes of illustration, it is contemplated that the depth of cut for a 2¼ inch diameter ear of corn can be cut as deep as ⅜ inch and with the same setting, a 1¾ inch ear would be cut at a ¼ inch depth. The adjusting knob is such that the depth of cut could be regulated to ⁵⁄₁₆ inch for a 2¼ inch diameter ear and corresponding depth of ³⁄₁₆ inch for a 1¾ inch ear. Of course, these figures are only illustrative and the adjusting knob provides for incremental changes within the limits of the example.

With the above in mind, it will be understood that the operation of the depth gage regulators and cutting blades is such as to accommodate differences in diameter, not only between successive ears of corn, but also in incremental portions throughout the length of a single ear of corn. This relationship is particularly advantageous due to the increasing production to many hybrid varieties of corn. Many of these varieties taper throughout most if not all of their length and the kernel size varies in accordance with the size of the diameter throughout the length of the ear. The operation of the present cutting head is particularly adapted to change its depth of cut in response to the change in the diameter of the ear of corn as determined by the position of the depth gage regulators. In this manner, all of the kernels throughout the length of the ear are cut at the most efficient position possible so that there is neither wastage in cutting large kernels, nor inefficient cutting when removing small kernels. With the present arrangement, wastage is reduced 25 to 50% over prior arrangements.

It can thus be seen that there has been provided a cutting head which is highly efficient in operation. The cutting head is constructed so that no elements are disposed in the space below the cutting blades. By eliminating any structural elements in this space, there is no possibility of corn silk and other residue accumulating on the head so as to require frequent cleaning.

By separately mounting the depth gage regulators and the cutting blades on the head plate 12 and providing an improved motion transmitting means between these separately mounted elements, the depth of cut of the blades can be regulated in response to the diameter of the ear of corn being cut. Since the depth gage regulators are disposed adjacent the blades, this change in depth in response to change in corn diameter is effective throughout the length of a single ear, as well as accommodating successive ears of different diameter. The motion transmitting means is such that it can be easily adjusted to vary the rate of depth change throughout the limits of movement. Moreover, for any given rate of depth change within the limits provided, the depth of cut may be varied by the operation of the adjusting knob assembly 108.

It will be readily understood that the cam elements, which are shown as embodying bifurcated lever ends receiving rollers, can be modified to achieve different rates of depth variance within the limits provided. That is, the rate of depth change throughout the limits of movement can be controlled by modifying the contour, either of the rollers or the portion of the bifurcated ends which engage the latter. If a uniform rate of depth change is desired throughout the limits, then intermeshing gear teeth could be provided in lieu of the roller and bifurcated end shown. It will be readily apparent that other types of construction may be utilized to secure different rates of depth change within the limits provided, as desired.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a corn cutting machine, the combination comprising support means, a plurality of circumferentially arranged depth gage elements mounted on said support means for simultaneous movement between inner and outer limiting positions in resonse to changes in the diameter of the corn engaged thereby, a first member mounted on said support means for movement in response to the simultaneous movement of said depth gage elements, a second member movably mounted on said support means, a plurality of circumferentially arranged cutting blades mounted on said support means adjacent said depth gage elements for simultaneous movement between inner and outer limiting positions in response to the movement of said second member, and means for connecting said first member with said second member to thereby position said cutting blades in response to the position of said depth gage elements, said last-mentioned means including a turning knob actuated adjusting device for varying the relative positions of said members to thereby vary the position of said cutting blades for any given position of said depth gage elements, said adjusting device including a bracket pivoted at one end to one of said members, and a threaded member having a turning knob on one end thereof connected with said bracket and pivotally connected to the other of said members, said threaded member being pivotally connected to said other member by a pivot member secured to the other end thereof, said pivot member being pivoted to said other member by a pin extending therethrough and through a longitudinal slot in said member.

2. The combination as defined in claim 1 wherein said threaded member has a compression spring surrounding the same, said spring having one end abutting said pivot member and its opposite end abutting said bracket, said one end of said threaded member slidably extending through said bracket and having said turning knob threaded thereon in engagement with said bracket.

3. The combination as defined in claim 2 wherein the engaging surfaces between said knob and said bracket are serrated.

4. A corn cutting head comprising a support having an opening through which the corn to be cut is fed in the direction of the axis of the cobs, a first series of shafts rotatably mounted in said support, a series of depth gage arms fixed to said first series of shafts and having depth gage elements on the outer end thereof disposed in substantially equal circumferentially spaced relation about said support opening and movable between inner and outer limiting positions in response to changes in the diameter of the corn engaged thereby, a member movably mounted on said support, means connecting said first series of shafts together for simultaneous movement and for movement with said member, a second series of shafts rotatably mounted in said support, a series of blade mounting arms fixed to said second series of shafts and having cutting blades secured thereto in substantially equal circumferentially spaced relation about the support opening for movement between inner and outer limiting positions to accommodate changes in the diameter of the corn being cut thereby, a ring rotatably mounted on said support, a series of circumferentially spaced cam rollers carried by said ring, a lever arm connected to each shaft at one end and having its opposite end bifurcated to receive a cam roller, and means for connecting said member with said ring so that said cutting blades will move between their inner and outer limiting positions in response to the movement of said depth gage elements between their inner and outer limiting positions, said last-mentioned means including means for varying the relative positions of said member and said ring with respect to each other so as to increase or decrease the relative position of said blades with respect to said depth gage elements for any given position between said limiting positions.

5. A corn cutting head as defined in claim 4 wherein means is provided for securing the one end of each lever arm with its associated shaft for adjustment angularly with respect thereto to thereby vary the rate of movement of said cutting blades for any given rate of movement of said depth gage elements.

6. In a corn cutting head including a support having a horizontally extending opening therein through which the corn to be cut is fed in the direction of the axis of the cobs, a plurality of depth gage elements carried by said support in substantially equal circumferentially spaced relation about said opening for engagement with the exterior surface of the ears fed to said opening and for inward and outward movement in response to changes in diameter of the ears engaged thereby, a plurality of cutting blades carried by said support adjacent said depth gage elements in substantially equal circumferentially spaced relation about said opening for cutting the kernels from the cobs of the ears immediately after engagement thereof with said depth gage elements, and means connecting said depth gage elements with said cutting blades for effecting inward and outward movements of the latter in response to the inward and outward movements of said depth gage elements, the improvement comprising said depth gage elements being carried by said support at locations above a horizontal plane passing through the lowermost cutting blade such that the space below said cutting blades is free from structure disposed in the path of the kernels and other material cut from the cobs by said cutting blades and falling by gravity therefrom.

7. The improvement as defined in claim 6 wherein each of said depth gage elements is secured to one end of a mounting arm, said mounting arms being pivotally mounted on said support.

8. The improvement as defined in claim 7 wherein the pivotal axes of said mounting arms are fixed and disposed in a common circle concentric with said opening.

9. The improvement as defined in claim 8 wherein each of said mounting arms is pivotally mounted on said support by means of a shaft journaled in said support and fixed to the associated mounting arm.

10. The improvement as defined in claim 8 wherein said mounting arms are of general hook-shaped configuration.

11. The improvement as defined in claim 8 wherein six depth gage elements and mounting arms are provided, the arcuate movement of four of said mounting arms being in a direction opposite to the arcuate movement of the other two mounting arms during either the inward or outward movement of the associated depth gage elements.

12. A corn cutting head comprising a support having an opening through which the corn to be cut is fed in the direction of the axis of the cobs, a first series of shafts rotatably mounted in said support, a series of depth gauge arms fixed to said first series of shafts and having depth gauge elements on the outer end thereof disposed in substantially equal circumferentially spaced relation about said support opening and movable between inner and outer limiting positions in response to changes in the diameter of the corn engaged thereby, a ring rotatably mounted on said support, lever arms carried by at least some of the shafts of said first series, said lever arms having bifurcated outer ends receiving cam rollers journalled on said ring, a second series of shafts rotatably mounted in said support, a series of blade mounting arms fixed to said second series of shafts and having cutting blades secured thereto in substantially equal circumferentially spaced relation about the support opening for movement between inner and outer limiting positions to accommodate changes in the diameter of the corn being cut thereby, a member movably mounted on said support, means connecting said second series of shafts together for simultaneous movement and for movement with said member, and means for connecting said ring with said member so that said cutting blades will move between their inner and outer limiting positions in response to the movement of said depth gauge elements between their inner and outer limiting positions, said last mentioned means including means for varying the relative positions of said ring and said member with respect to each other so as to increase or decrease the relative position of said blades with respect to said depth gauge elements for any given position between said limiting positions.

13. A corn cutting head as defined in claim 12 wherein said lever arms are secured to said shafts of said first series for angular adjustment with respect thereto to thereby vary the rate of movement of said cutting blades for any given rate of movement of said depth gage elements.

14. A corn cutting head as defined in claim 13 wherein all of the shafts of said first series are disposed above the lowermost cutting blade.

References Cited in the file of this patent

UNITED STATES PATENTS

| Number | Name | Date |
|---|---|---|
| 722,874 | McIntyre | Mar. 17, 1903 |
| 1,579,511 | Burpee | Apr. 6, 1926 |
| 2,792,839 | Sheridan | May 21, 1957 |